J. E. WALLACE.
AIR BRAKE SYSTEM.
APPLICATION FILED DEC. 1, 1904.
1,130,224.
Patented Mar. 2, 1915.
5 SHEETS—SHEET 1.
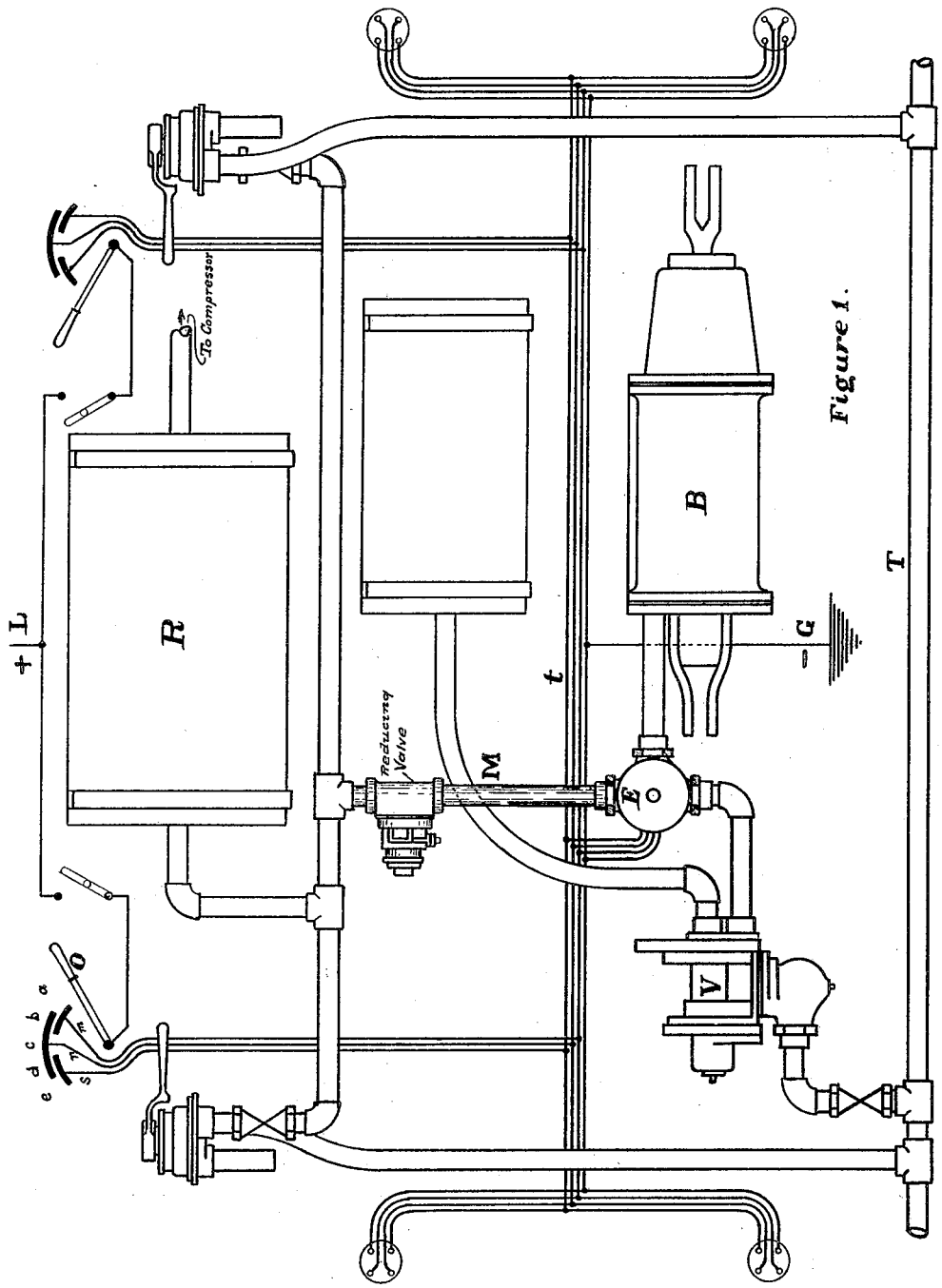
Witnesses
Geo. W. Daniels
M. A. Kilbride
Inventor
J. Eugene Wallace.
By
J. A. Storm.
Attorney

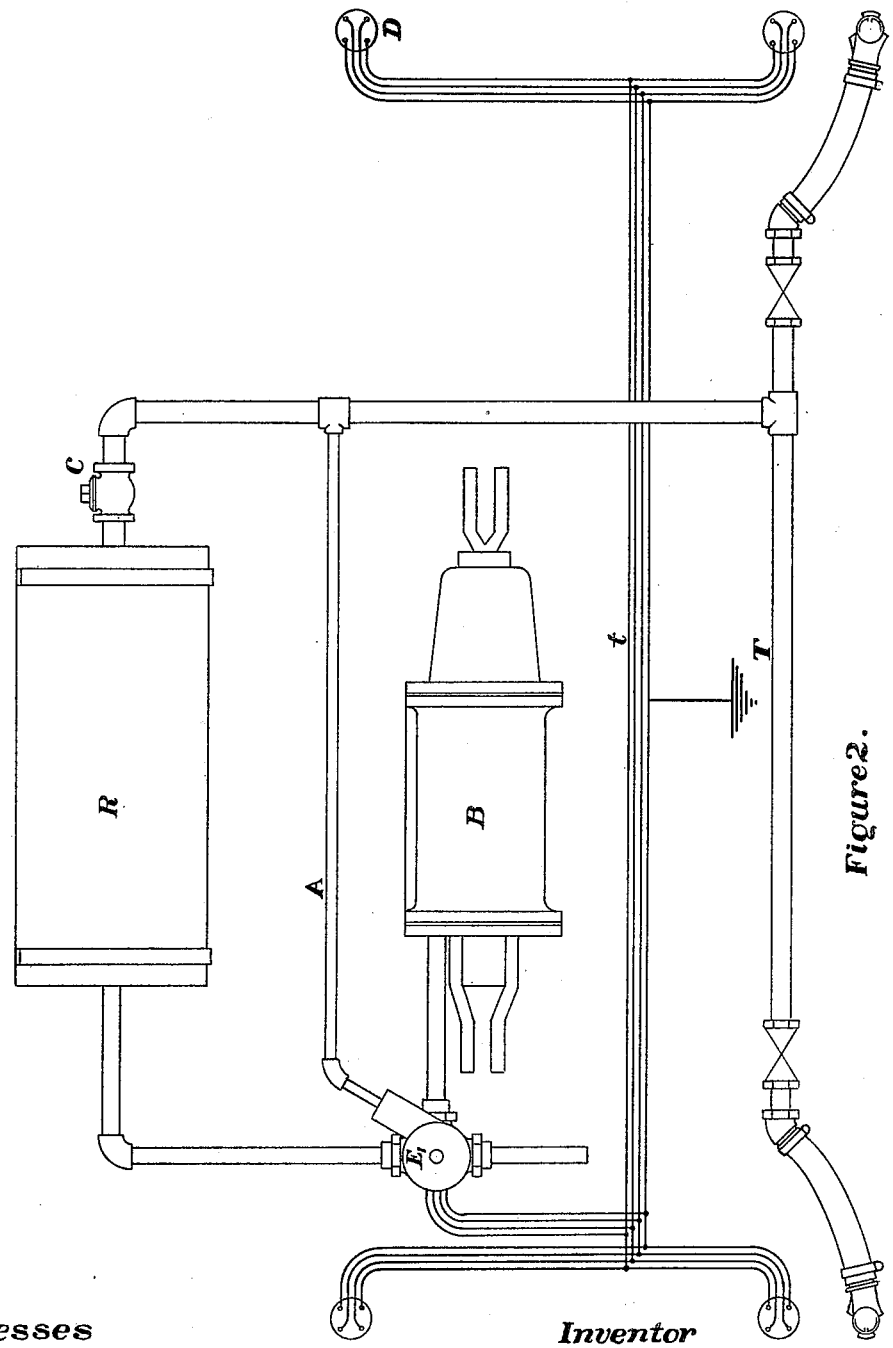

J. E. WALLACE.
AIR BRAKE SYSTEM.
APPLICATION FILED DEC. 1, 1904.

1,130,224.

Patented Mar. 2, 1915.
5 SHEETS—SHEET 3.

Fig. 3.
DIAGRAMMATIC POSITIONS

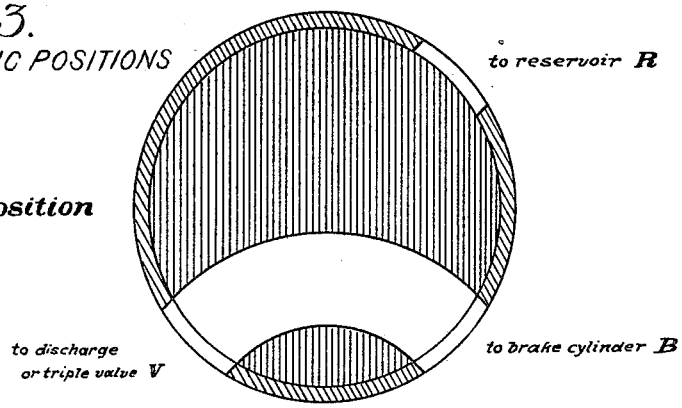

Release Position to discharge or triple valve V
to reservoir R
to brake cylinder B

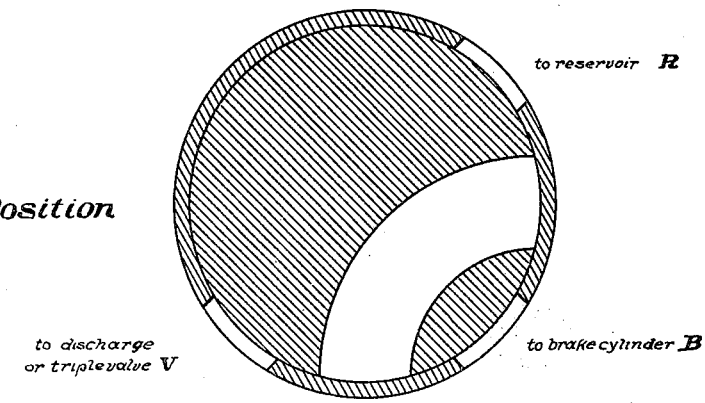

Lap Position to discharge or triple valve V
to reservoir R
to brake cylinder B

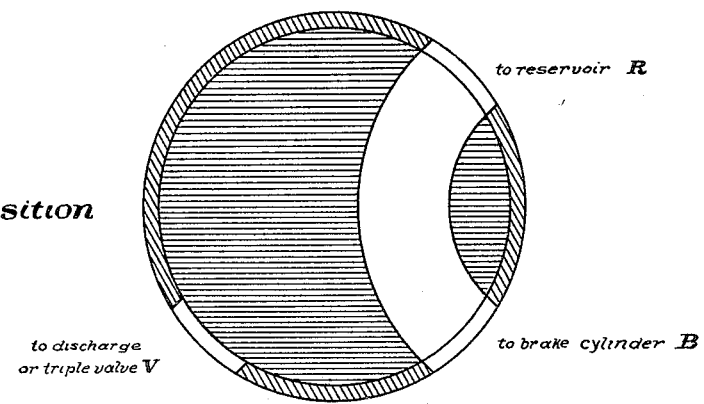

Brake Position to discharge or triple valve V
to reservoir R
to brake cylinder B Witnesses Inventor
J. EUGENE WALLACE
By
Attorney J. E. WALLACE.
AIR BRAKE SYSTEM.
APPLICATION FILED DEC. 1, 1904.
1,130,224.
Patented Mar. 2, 1915.
5 SHEETS—SHEET 4.
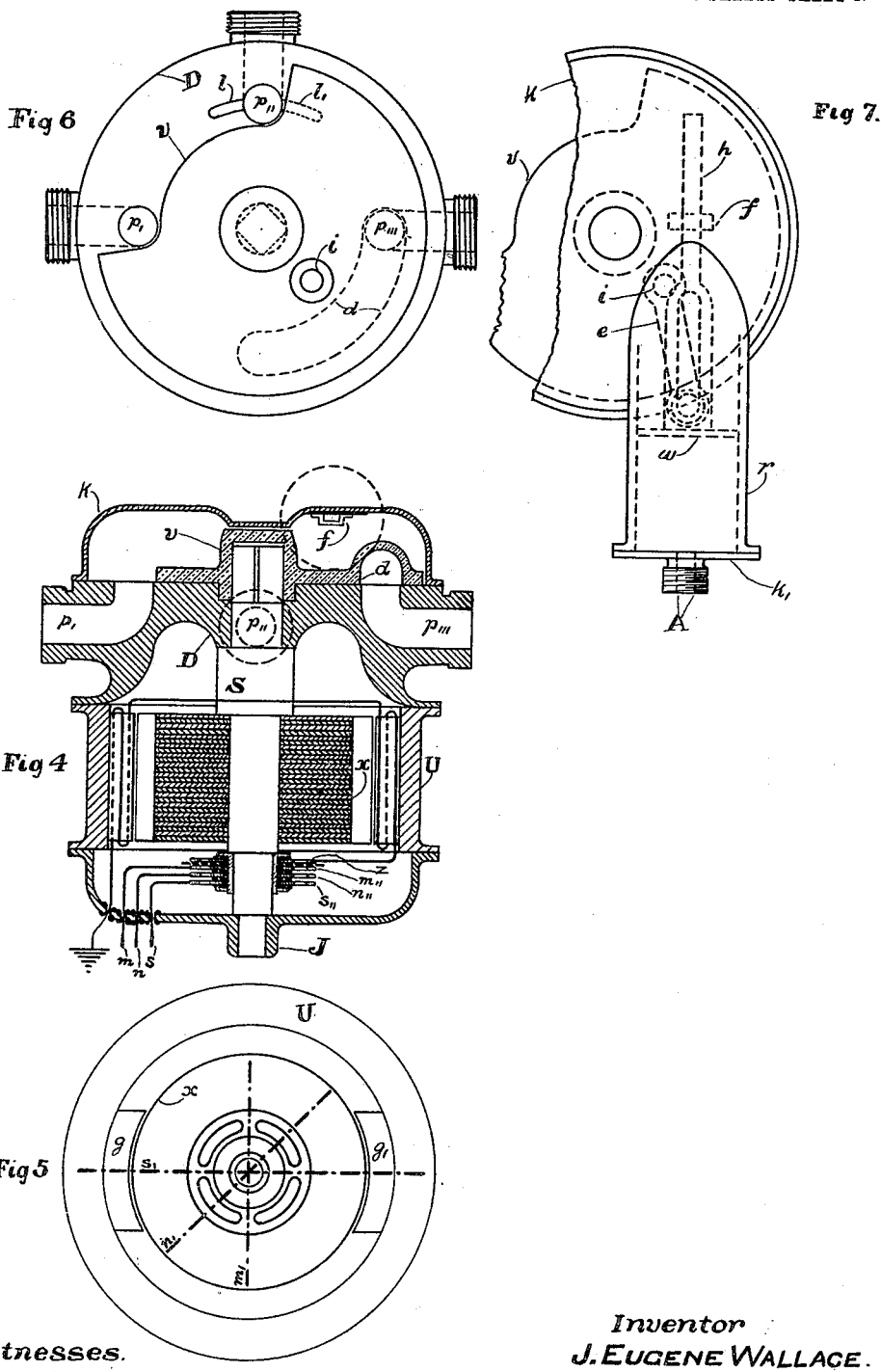
Witnesses.
Inventor
J. EUGENE WALLACE.
By
Attorney.

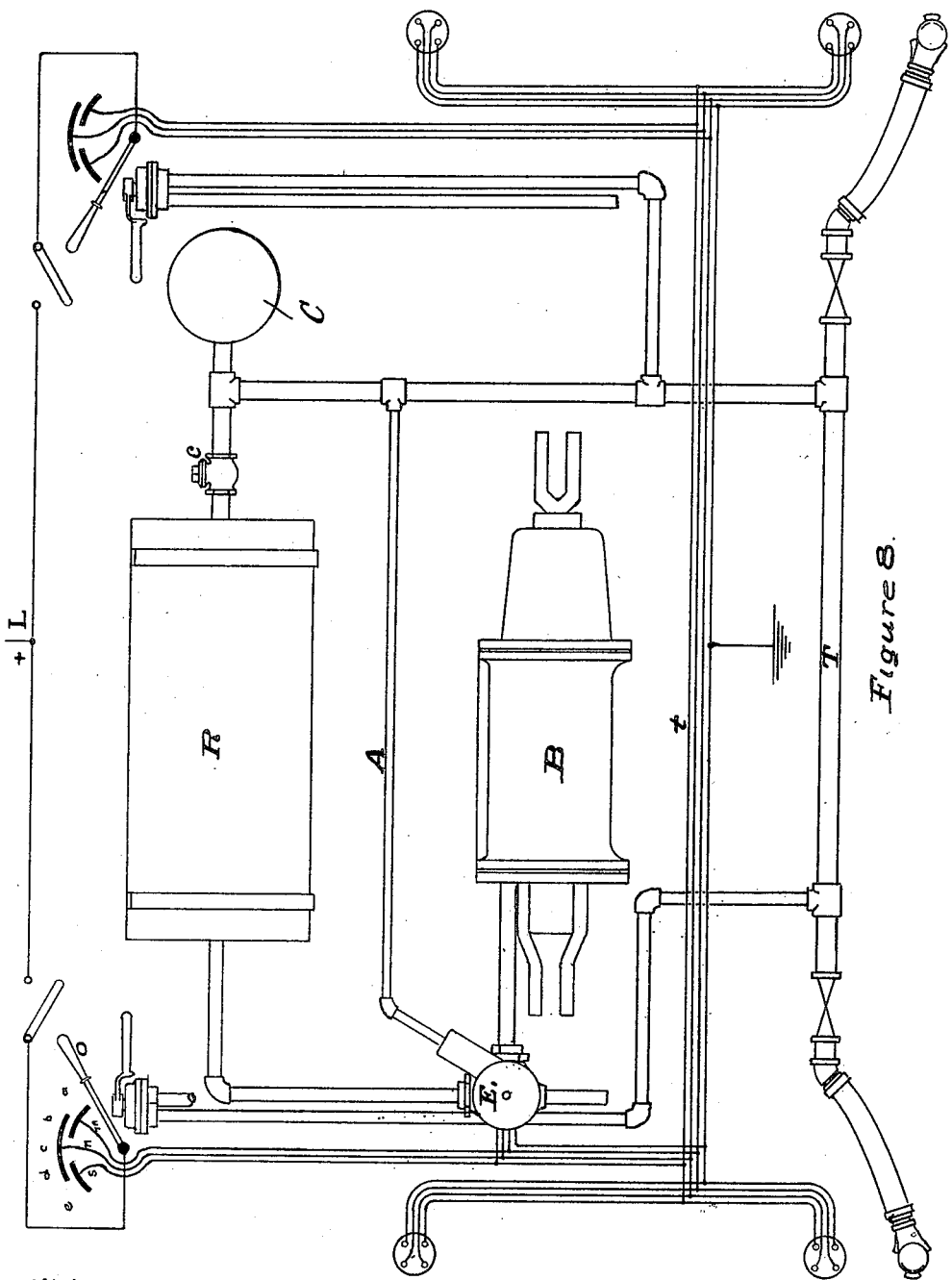

UNITED STATES PATENT OFFICE.

JOHN EUGENE WALLACE, OF NEW YORK, N. Y.

AIR-BRAKE SYSTEM.

1,130,224.  Specification of Letters Patent.  Patented Mar. 2, 1915.

Application filed December 1, 1904. Serial No. 235,005.

*To all whom it may concern:*

Be it known that I, JOHN EUGENE WALLACE, a citizen of the United States of America, and a resident of New York, borough of Brooklyn, county and State of New York, have invented certain new and useful Improvements in Air-Brake Systems, of which the following is a specification.

The system intended to be described in this specification is what I call a "direct air" system of braking and will be described as having two forms. First: a system hereafter termed the automatic-direct system which consists of certain later described additions to the well known "automatic-air" brake systems in vogue. Second: a system hereafter termed the direct-acting system which is a complete system in itself. The systems will give, on all the cars which may compose a train, the braking effect of what is commonly known as "straight air", and briefly described may be said to be systems in which the air pressure is admitted direct to the various brake cylinders by means of valves controlled and operated by an electric current in wires on the train, instead of by a pressure of air in the "train-pipe" of the "automatic-air" brake systems in use on the railroads of the present date.

The object is to provide a system whereby all the brakes on a train of one or more cars may be applied, released, and applied again, several times in rapid succession, without the brakes becoming ineffective from a condition in connection with automatic-air brake systems known among practical railroad men as "losing the air", which condition is due to a lack of air pressure in the "auxiliary reservoir" of an automatic-air brake system. The "straight-air" brake systems manually operated, that are in use at the present date, give such results but for practical reasons are limited to operation on not more than two or three cars, and do not possess the automatic safety feature which is a part of my invention in connection with the systems described by this specification.

A further object is to provide a system of braking in which all the brakes, on the cars which may compose a train, may be applied promptly and as promptly released, or partially released, by allowing the whole or only a part of the air pressure to escape from each of the brake cylinders that may be on the cars of which the train is composed.

The advantages of the system described in this specification are that the action of all brakes on the various cars composing a train will be practically simultaneous, in as much as that the action of the electric current on the various valves admitting air to, or releasing air from the various brake cylinders will be practically simultaneous, and that the pressure of the brake shoes on the wheels of the various cars will be practically unaffected by the travel of the piston in the various cylinders, as goverened by the amount of slack in the various brake riggings.

In the accompanying drawings, which form a part of these specifications, Figure 1 illustrates the details of an automatic-direct system of braking for a car provided with motive power. Fig. 2 shows the details of a car, not provided with motive power, equipped with a direct-acting system of braking. Fig. 3 is digrammatically illustrative of the valve controlling the admission of compressed air to, and discharge of compressed air from the brake cylinder at positions defined as release position, lap position, and brake position. Fig. 4 is a section of an electrically operated valve. Fig. 5 is a view, with the bearing casting removed, of the electro-magnetic device for operating the valve. Fig. 6 is a view, with the cover removed, of the valve at brake position. Fig. 7 is illustrative of the differential device, used for emergency conditions in the direct-acting system of braking. Fig. 8 illustrates the details of a direct acting system of braking for a car equipped with motive power.

*Automatic-direct system of braking.*—Fig. 1 shows diagrammatically a car provided with the well known automatic air brake equipment. My invention consists of the addition of the electrically operated valve E, the pipe connection M, between valve E and the reservoir R, the electric wiring t, shown between the points L and G, and the electric switching mechanism at O, for the purpose of controlling the movements of the valve E. The valve E has but one movable member (the part v as shown in Fig. 4) and is termed, therefore, a single element valve.

The constructional features of the electrically operated valve, which in the automatic-direct system, as shown on Fig. 1, is located in the pipe connection between the triple-valve V and the brake cylinder B, of the automatic air equipment provided, will be described as follows: The valve proper is a three-way valve, as diagrammatically shown on Fig. 3. The moving element of the valve proper is actuated by a system of electro-magnets, preferably three in number, so designed that if one set of magnets is excited by an electric current the valve will take the position diagrammatically shown on Fig. 3 as release position. A second set being excited by the electric current in a second wire the valve takes a position described on Fig. 3 as lap position. The third set of magnets being excited by an electric current causes the valve to take the position shown as brake position. If two sets of magnets are excited by current flowing in two wires at one and the same time the valve will take a position midway between the magnets so excited. Normally the valve will be held at release position by a moderate mechanical force created either by a compressed air device or by a spring, (neither shown in the drawings). The mechanical force will not be sufficiently strong to prevent the proper operation of the valve by magnetic forces but will be sufficiently strong to force the valve to release position, if for any reason magnetic forces are removed.

A more detailed description of the construction it is intended to use in connection with the valve is shown by Figs. 4, 5, and 6. In these drawings a shaft is shown, supported at one end by the body D of the valve, and at the other end by the bearing casting J. The two parts are held in relation to each other by being bolted to the yoke U of the magnetic circuit. The valve end of the shaft is made rectangular in order that any movement of the shaft shall cause corresponding movement of the valve, and facilitate easy removals for inspection and repairs. On the shaft S is fixed a circular armature $x$ which rotates between the electro-magnets $g$ and $g_{\prime\prime}$, as shown on Fig. 5. The armature is wound with three independent windings, placed at different angles, the center line through the various windings being given by the dot and dash lines $m_{\prime\prime}$, $n_{\prime\prime}$, and $s_{\prime\prime}$, shown on Fig. 5, therefore, if electric current flow in any particular winding the magnetic forces in the armature take the direction indicated by the particular center-line. On the shaft S are mounted four collector rings $m_{\prime\prime\prime}$, $n_{\prime\prime\prime}$, $s_{\prime\prime\prime}$, and $z$, electrically insulated from the shaft and from each other. Through the medium of these collector rings, current is supplied to the various windings on the armature. The negative terminal of all the windings are electrically connected to collector ring $z$, and from thence the current passes through coils mounted on the electro-magnets $g$ and $g_{\prime\prime}$, and finally to the negative supply point or ground.

The body D of the valve is shown in Figs. 4 and 6 to have three passages $p_{\prime}$, $p_{\prime\prime}$ and $p_{\prime\prime\prime}$. Passage $p_{\prime}$ is connected with the reservoir R of compressed air. Passage $p_{\prime\prime}$ is connected with the brake cylinder B. And passage $p_{\prime\prime\prime}$ connects with the triple-valve or atmospheric discharge, as the case may be. The construction and movements of valve $v$ leaves passage $p_{\prime}$ at all times uncovered, thus giving full communication at all times between the reservoir of compressed air and the chamber inclosed by the cover $k$ of the valve and the body D of the valve, whereby a constant pressure is maintained at the valve $v$ for use in the brake cylinder. In Fig. 6 the valve is shown standing at brake position whereby passage $p_{\prime\prime}$ is uncovered and full communication is established between the brake cylinder and the reservoir. Release position is obtained by moving the valve $v$ 90° from brake position, whereby a passage in the valve $v$, shown in dotted line in Fig. 6, fully registers with passages $p_{\prime\prime}$ and $p_{\prime\prime\prime}$ giving full communication between the brake cylinder and atmospheric discharge. Lap position is midway between brake position and release position and causes the valve $v$ to close all communication between the various passages in the body D of the valve.

The reservoir R, directly supplied with compressed air by the air compressor or compressors on the train, is connected to valve E by means of the pipe M, thus providing a means whereby pressure may be obtained directly from the reservoir R to the brake piston. In the automatic-direct system pipe M will usually be supplied with a reducing valve for the purpose of reducing the reservoir pressure to a proper value for the brake cylinder. Cars not provided with motive power, usually termed trailers or coaches, are usually not equipped with a reservoir directly connected to an air compressor. Trailer cars and coaches when equipped for the automatic-direct system will be provided with a reservoir supplied with compressed air from the "train-pipe" T, and a check valve will be placed in the pipe connection between the reservoir and train-pipe in such a manner that any reduction in pressure in the train-pipe will not allow air to flow back from the reservoir into the train-pipe.

The details of the electric wiring for an automatic-direct system equipment are diagrammatically shown in Fig. 1. At O is a switching mechanism for the purpose of controlling the electric current in the various wires. A trailer car or coach ordinarily does not require the switching mechanism O and only the wires $t$ are absolutely required. Fig. 2 represents diagrammatically the wiring that will ordinarily be used on trailer cars or coaches.

Wires $t$ similarly related, on Figs. 1 and 2, with respect to valve E, in the various cars which constitute a train, will be connected in series by means of flexible wire connections between the various cars, thus making a continuous electric circuit from one end of the train to the other, and causing similar movements in all electrically operated valves E. The switching mechanism at O is arranged so that any particular circuit may be individually supplied with current or two circuits may, at one and the same time, be supplied with current.

*Operation.*— The operation of the "straight-air" feature of the automatic-direct system will be described as follows, it being understood that reference to valve E means every electrically operated valve that may be on the cars that constitute the train being operated. A difference of potential will be maintained between the points L and G, on Fig. 1, and a cut-out switch located between the point L and the operating mechanism at O will be closed. The operator moving the handle of the switching mechanism at O to position $a$ causes current to flow in the wire $m$, which in turn causes the valve E to be magnetically held at release position, diagrammatically illustrated in Fig. 3. The release position, it will be seen, closes any connection between the reservoir R and the brake cylinder B, and opens a connection to atmosphere through the discharge passage in the triple-valve V, thus allowing any pressure of air in the brake cylinder to escape. Moving the handle at O to $b$ position causes current to flow in wires $m$ and $n$, whereby valve E takes a position midway between release position and lap position, diagrammatically shown on Fig. 3, which it will be seen partially closes the connection to atmosphere from the brake cylinder B, the actual communication, in this position, is through the small groove $l_{,,}$ shown in dotted line on Fig. 6. The handle at O placed at $c$ position causes current to flow in only wire $n$, whereby valve E takes lap position. The operating handle moved to position $d$ causes current to flow in the wires $n$ and $s$, whereupon the valve takes a position midway between lap position and brake position, and thereby permits a small opening between reservoir R and brake cylinder B, through the groove $l$, shown on Fig. 6, whereby compressed air flows slowly into the brake cylinder and the brakes are slowly applied to the wheels of the various cars of the train. If it is desired to admit compressed air rapidly into the brake cylinder B, the operating handle at O will be moved to $e$ whereupon the valve E will take the full brake position and gives full opening between the brake cylinder and the reservoir of compressed air. Sufficient air having been admitted to the brake cylinder to obtain the braking effect wanted, the operator will move the handle at O to $c$ position and the valve E accordingly takes lap position and maintains the brake pressure so long as it is desired. If it is desired to release a small portion of the brake pressure, the operator will move the operating handle to $b$ position, causing valve E to take a position midway between lap position and release position, permitting air to slowly escape from the brake cylinder B through groove $l_{,}$. Sufficient air having escaped the valve will be returned to lap position by moving the operating handle to $c$ position. When it is desired to fully release the brakes, the operating handle will be moved to $a$ position, and finally to position shown on Fig. 1, which leaves the valve E at release position, diagrammatically shown on Fig. 3. When valve E stands at release position the connection between the triple-valve V and the brake cylinder B, of the regular automatic equipment of the car, is unobstructed and "automatic air braking" can be performed in accordance with standard practice. In the automatic-direct system, valve E will be held at release position by a moderate mechanical force, sufficient to carry it to that position if magnetic forces are released, therefore, if at any time a train may break in two, valve E will return to release position and the reduction of pressure in the train-pipe T will cause the triple-valve V to apply brakes in accordance with the usual performance of automatic-air.

*Direct-acting system of braking.*—In the drawings which form a part of this specification Fig. 2 diagrammatically represents a "trailer car or coach" equipped iwth a direct-acting system of breaking. A car supplied with motive power will be equipped in a similar manner except, as shown in Fig. 8 that the reservoir R will be supplied with compressed air direct from a compressor C on the car, and the electric wiring $t$ will be increased to include the operating mechanism O and the potential supply point L, as shown on Fig. 1.

The electrically operated air valve $E_{,,}$ used in connection with the direct-acting system of braking, in its electrical and magnetic details of construction is exactly similar to the valve used in connection with the "straight-air" feature of the automatic-direct system which has been described, and will operate in parallel relation with that valve.

In the direct-acting system, the valve $E_{,}$ shown on Fig. 2 is provided with a differential device so constructed that the pressure on one side is from the reservoir R and on the other side from the "train-pipe" T through the medium of pipe A, as shown on Fig. 2. Any reduction of pressure in the train-pipe T, therefore, unbalances the pressure on the two sides of the device, and the valve will be forced to brake position by mechanical connections between the valve and the differential device.

The general construction it is intended to use in the differential device is illustrated by Fig. 7, the moving parts of the device being shown in dotted line. The drawing also shows the cover $k$ and the moving element $v$ of the valve. The cover $k$ is provided with a cylindrical projection $r$, the center line of which does not pass through the pivotal point of the valve proper. The cylindrical projection is bored to a true circle and fitted with a piston $w$. The piston is maintained in alinement by an arm $h$ which in turn is supported by a guide $f$. The arm $h$ is equipped with a swinging connecting rod $e$ which engages the pin $i$, with which the moving element $v$ of the valve $F_{,}$ is provided. Any excess of pressure in the chamber occupied by the moving element $v$ of the valve over that in the cylinder, between the piston $w$ and the cover $k_{,}$, will cause a movement of the piston $w$ to the extreme end of its stroke, and thereby forces the valve to brake position. Normally the pressure in the chamber and in the cylinder will be the same, being maintained thus through the medium of pipe A, shown on Fig. 2 as connecting the cylindrical projection on valve $E_{,}$ to the train-pipe T. The arm $h$ is provided with a slot which enables the connecting rod $e$ to follow the movements of the valve in ordinary operation without a corresponding movement of the piston $w$ being necessary.

Reservoir R, in Fig. 2 is supplied with compressed air from the train-pipe T, and a check valve C prevents any air flowing back into the train-pipe T, if the pressure in the latter is reduced. Reservoir R may be supplied with compressed air direct from an air compressor.

The electric wiring $t$, in Fig. 2, does not include an operating mechanism for controlling the movements of valve $E_{,}$ from a point on that car. Such mechanism may be included, if desired, as shown at O on Fig. 1, and will be included in the case of a car provided with motive power. In the latter case the electric wiring will be exactly similar in form to that diagrammatically shown on Fig. 1. All points from which the brakes can be operated in the direct-acting system will be provided with a valve whereby the operator may at will reduce the pressure in the train-pipe T for the purpose of meeting emergency conditions.

*Operation.*—The control of the electrically operated air valve E in the direct-acting system, for ordinary braking is exactly similar to the control of the electrically operated air valve in connection with the automatic-direct system of braking, and the two systems can be used on the same train with satisfactory results by the proper connection of the respective train wires. It will not be necessary, therefore, to describe in detail the operation of applying and releasing the brakes in the direct-acting system, since the process has been described in connection with the automatic-direct system of braking.

The automatic safety feature of the direct-acting system of braking lies in the differential device mentioned in connection with valve $E_{,}$. If a train break in two the consequent reduction of pressure in the train-pipe T, will cause the valve $E_{,}$ to go to brake position and full braking power is applied for the purpose of stopping the train.

It is obvious that I have not described in minute detail the constructional features of the apparatus that will be used to obtain the results that I have indicated in the foregoing. I shall not limit myself to any specific construction of apparatus but shall use the best that time and experience develops while not departing from the spirit and meaning of my invention.

The practical results of the systems developed in the foregoing specification, and the drawing illustrating it, when developed in their entirety, is that cars when properly equipped can be made up into trains of any length and that the operator at the head of the train has complete and synchronous control of every valve that admits compressed air into a cylinder for the purpose of applying brakes to the wheels under the various cars. Further, the operator can at will partially release the brakes on every car on the train, and under no circumstances can he so manipulate the braking system that it becomes temporarily ineffective for the purpose of applying a retarding movement to the train. Certain devices consisting of a differential device in connection with the valve $E_{,}$ in the direct-acting system, and an air pressure device or a spring device in connection with the valve E in the automatic-direct system, will be provided for safety features and to meet emergency conditions. To accomplish these purposes electricity will be used and is the fundamental basis of operation, but it is clear that many methods may be used without departing from the spirit of my invention.

What I claim to have invented and desire to secure by Letters Patent of the United States, is—

1. A system of valves rotated by magnetic torque into various positions for the purpose of controlling the admission and discharge of fluid pressure to and from the brake cylinders on a train of one or more cars, and put in parallel operative relation by the use of three or more train wires in which electric current shall flow in a given direction.

2. A system of valves using resultant magnetic forces for the purpose of controlling the admission and discharge of fluid pressure to and from the brake cylinders of a train of one or more cars, and put in parallel operative relation by the use of three or more train wires in which electric current shall flow in a given direction.

3. An air-brake cylinder, a valve controlling the admission and discharge of fluid pressure to and from said cylinder, and a plurality of electro-magnets actuating said valve to release, lap and brake positions and to positions intermediate of said release, lap and brake positions.

4. An air-brake cylinder, a valve controlling the admission and discharge of fluid pressure to and from said cylinder, and electric means for moving said valve part way to give partial release of said cylinder to the atmosphere.

5. An air-brake cylinder, a rotatable single element valve controlling the admission and discharge of fluid-pressure to and from said cylinder, and electric means for rotating said valve to and holding the same at lap-position.

6. In an air-brake system, the combination of a brake cylinder equipped with a moving piston fitted to the bore of the cylinder, a reservoir at all times in communication with an air compressor actuated by a revolving electric motor, or a steam motor, and a valve in the channel of communication between the brake cylinder and reservoir which by electro-magnetic forces can be moved to and held at lap-position.

7. An air-brake cylinder, a valve controlling the admission and discharge of fluid pressure to and from said cylinder, an electric magnet and armature connected with said valve having a plurality of windings on the armature at different angles so that the magnetic forces will cause the armature to take different angles to operate said valve to give various degrees of admission and discharge of fluid pressure to and from said cylinder.

8. In an air-brake system, the combination of two or more electro-magnetic circuits acting in different directions on one common armature for the purpose of controlling the admission and discharge of fluid pressure to and from the brake cylinder of a car.

9. In a straight air system of braking, using a train-pipe, a reservoir in which pressure should be maintained constant, and the usual brake cylinder; the combination of a check valve in the channel of communication between the train-pipe and reservoir used in conjunction with an electrically operated valve in the channel of communication between the reservoir and brake cylinder, the check valve being so placed to prevent fluid pressure flowing from the reservoir to the train pipe as an accessory to emergency devices with which the electrically operated valve is equipped.

10. In an air-brake system, the combination of a brake cylinder and a valve using electrically operated devices for graduating the amount of the opening in the channel of communication between the brake cylinder and atmosphere.

11. A differential device affected by a reduction of pressure in a train-pipe interconnected with an electrically actuated valve, said valve operating to admit or discharge fluid pressure to and from the brake-cylinder, and said differential device operating the same valve element to admit and discharge fluid pressure to and from the brake cylinder.

12. In combination with a reservoir at all times in communication with an air compressor, a normally electrically operated valve fitted with a differential device whereby a reduction of pressure in the trainpipe causes fluid pressure to be admitted direct from the reservoir into the brake cylinder.

13. In an air-brake system, the combination of a brake cylinder equipped with a moving piston fitted to the bore of the cylinder, a reservoir in which fluid pressure is maintained constant by being at all times in communication with an air compressor, and an electrically controlled valvular action in the channel of communication between the brake cylinder and the reservoir, capable of maintaining lap-position, whereby fluid pressure may be admitted, as desired, to the brake cylinder and thence discharged to atmosphere.

14. An air-brake cylinder, a fluid pressure reservoir communicating with said cylinder, a valve capable of maintaining lap-position in the communication between the cylinder and reservoir, and electric means for moving said valve from lap-position to various degrees of communication between the cylinder and reservoir.

15. In combination with an electrically operated valvular action capable of maintaining lap-position and a train-pipe, a system of braking in which the flow of fluid pressure shall always be in a given direction from the train-pipe to the reservoir and through the reservoir to the brake cylinder.

16. In combination with a brake cylinder, a reservoir, and a train-pipe; a valvular action electrically and pneumatically operated, capable of delivering under either conditions of operation and full fluid pressure developed by the compressor, or compressors, to the brake cylinders.

17. In combination with an air compressor, a reservoir, a train-pipe, and a brake cylinder; a valvular action which may be maintained at release position, or lap-position, or brake applied position without interrupting the channel of communication between the compressor and the train-pipe, or between the train-pipe and reservoir, as the case may be.

In testimony whereof, I, J. EUGENE WALLACE have signed my name to this specification in the presence of two subscribing witnesses, this 29th day of November, 1904.

J. EUGENE WALLACE.

Witnesses:
J. A. STOVER,
GEO. E. DANIELS.

Copies of this patent may be obtained for five cents each, by addressing the "Commissioner of Patents, Washington, D. C."